May 16, 1944.                     P. A. H. MOSSAY                     2,349,105
                            FLAMEPROOF ELECTRIC MOTOR
                              Filed June 5, 1943                3 Sheets-Sheet 1

Inventor:
Paul Alphonse Hubert Mossay
by: George Woodling
                 Atty.

May 16, 1944.   P. A. H. MOSSAY   2,349,105
FLAMEPROOF ELECTRIC MOTOR
Filed June 5, 1943   3 Sheets-Sheet 2
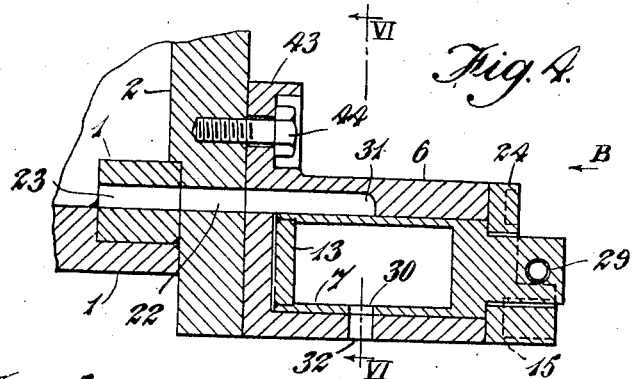
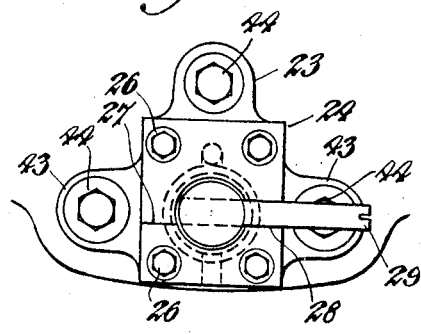
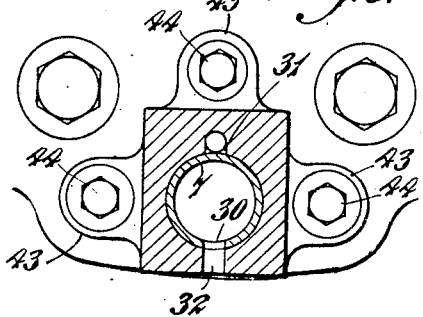
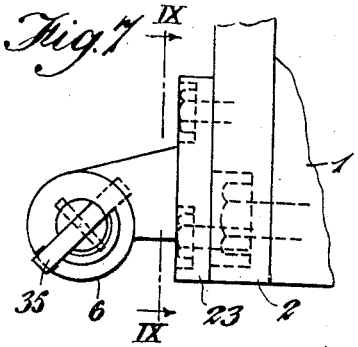
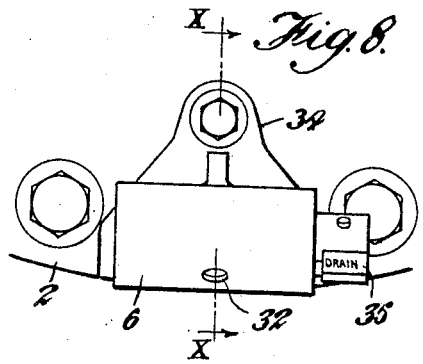
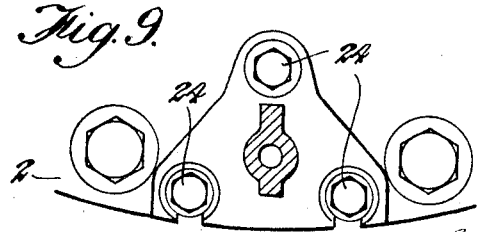
Inventor:
Paul Alphonse Hubert Mossay
by George Hoodling
atty May 16, 1944.   P. A. H. MOSSAY   2,349,105
FLAMEPROOF ELECTRIC MOTOR
Filed June 5, 1943   3 Sheets-Sheet 3

Inventor:
Paul Alphonse Hubert Mossay
by George Woodling
Atty.

Patented May 16, 1944

2,349,105

UNITED STATES PATENT OFFICE 2,349,105

FLAMEPROOF ELECTRIC MOTOR

Paul Alphonse Hubert Mossay, Norwich, England

Application June 5, 1943, Serial No. 489,871
In Great Britain June 1, 1942

4 Claims. (Cl. 172—36)

The invention relates to so-called flameproof electric motors of the surface cooled type and of the type in which numerous air cooling tubes are provided.

In such motors it is found that there is a possibility for water of condensation to accumulate in the totally enclosed casing, especially if the machine is not constantly in service. This is thought to be due partly to moisture present in the windings which, during the running of the machine, are heated, so that steam or vapour is generated which, when the machine is stopped, comes into contact with the motor casing and end shields and is condensed.

When the machine is heating up, a certain amount of internal air is expelled from the machine through the radial clearance in the bearing caps. During the cooling process, the reverse action takes place and fresh air is admitted into the machine and this air may contain a certain amount of moisture which, in turn, will be condensed at the end of the next period of operation. Thus, gradually more and more water accumulates in the machine.

This process may be intensified during the winter months or if the machine runs infrequently. If the machine is constantly in service, there is a tendency for the moisture to be gradually expelled out of the machine.

Owing to the close proximity of the winding to the inside wall of the outer shell under certain conditions, this amount of water may reach such a level that it touches the bottom coils which will become saturated and may cause electrical breakdowns.

The regulations which govern designs of flameproof motors are such that it is not permissible to fit a screw plug at the bottom of the machine which can be removed from time to time to allow any water accumulating in the machine to be drained, as it is considered that such a plug or plugs may not be replaced carefully and an internal explosion may allow the exit of hot gases, causing an explosion outside the machine.

In order to enable the water of condensation to be removed from a flame-proof electric motor by a safety draining device according to the invention, the motor is provided with a drain in its lowermost part for the discharge of water accumulating within the casing.

Provision should be made in the motor casing and, if necessary, according to the design of motor, in the stator pack and end shields to lead the accumulated water of condensation to the drain which may be merely a hole in the casing or in the end shield. A movable trap fitted in a housing adjacent to the motor drain is adapted, as it is moved in its housing from one position to another, alternately to receive water from the motor drain through a port in the housing and to deliver it through a delivery port in the housing, the trap and its housing being such that the port in the housing for receiving water from the motor is always closed when the delivery port of the housing is open, and vice versa, and an uninterrupted connection between the interior and exterior of the motor through the trap is impossible in whatever position the trap may be left.

In order to meet the regulations governing the construction of flame-proof motors, as regards leakage or creepage along the fine clearance between bearing surfaces, it is to be understood that the trap and the inner surfaces of the housing against which it bears may be ground to ensure that the clearance does not exceed the limits prescribed by the regulations.

The dimensions of the trap and its housing and the relative disposition of the ports should be such that the shortest length of creepage path along such clearance does not fall short of those prescribed by the regulations.

In the accompanying drawings:

Figure 4 is a sectional elevation showing another form of safety draining device according to the invention.

Figure 5 is an end view looking in the direction of the arrow B Figure 4.

Figure 6 is a sectional view on the line VI—VI Figure 4.

Figures 7 and 8 are, respectively, side and end views showing a further form of safety draining device according to the invention.

Figure 9 is a sectional elevation on the line IX—IX Figure 7.

Figure 1:
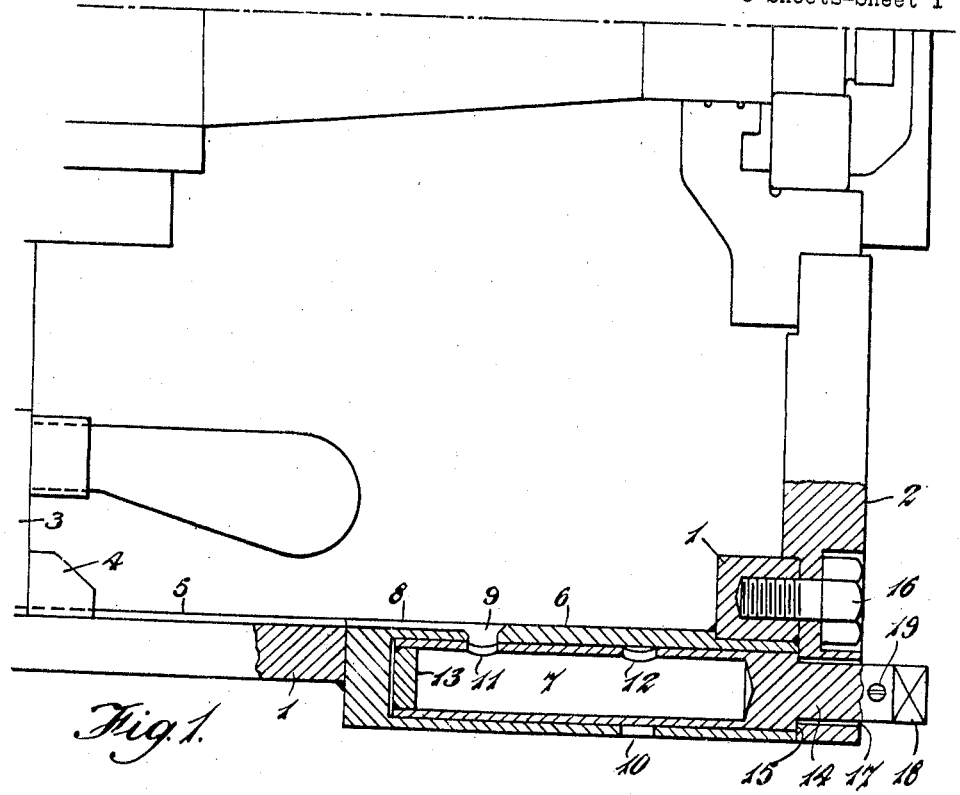
Figures 1 and 2 are sectional elevations showing part of a flame-proof motor with one form of safety draining device according to the invention applied thereto.
Figure 2:
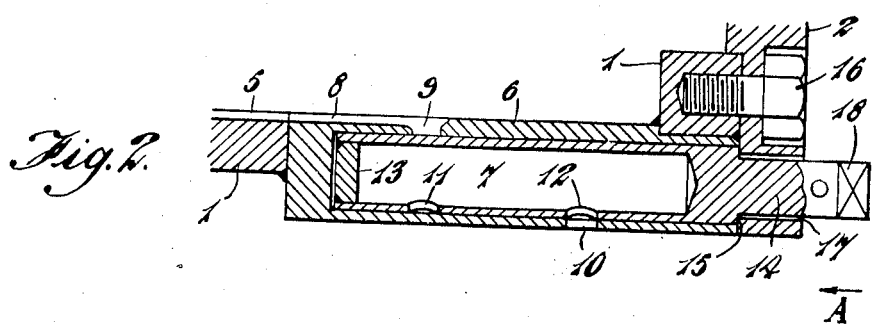
Figure 3:
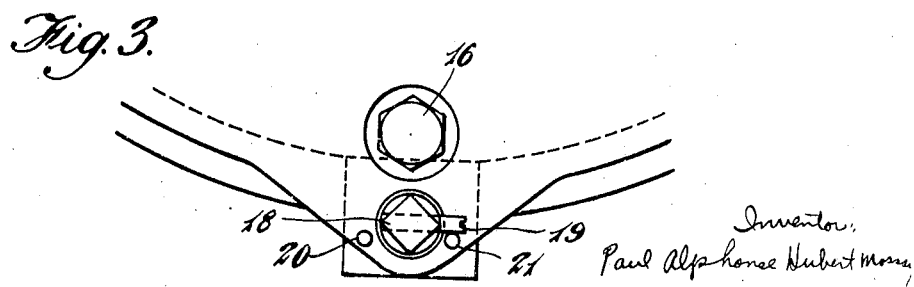
Figure 3 is an end view looking in the direction of the arrow A Figure 2.
Figure 10:
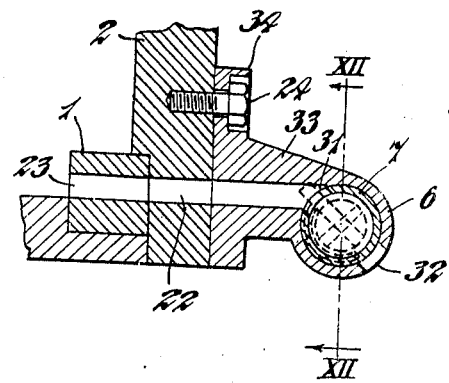
Figure 10 is a sectional elevation on the line X—X Figure 8, showing the trap in the "shut" position.
Figure 11:
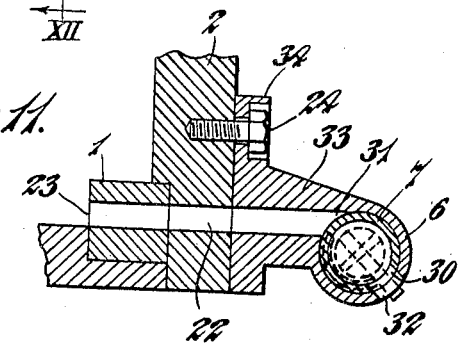
Figure 11 being a similar view showing the trap in "drain" position.

In the example illustrated by Figures 1 to 3, I indicates the motor casing, 2 an end shield, 3 part of the laminated stator pack or core, 4 one of the press rings thereof, being parts of a flameproof motor, for example, such as described in British Patent Specification No. 401,031.

A channel 5 is provided in the lowest part of the motor casing 1, and extends from one side of the stator pack to the other, the press rings 4 and the stator laminae 3 being grooved so as not to obstruct the channel.

A housing 6, bored to receive a cylindrical trap 7, is inserted in a suitable recess in one end of the casing 1, preferably the driving end of the motor. The housing 6 and the trap 7 are of brass or other suitable non-rusting material. The housing 6 is welded or brazed to the motor casing. It has a channel 8, forming a continuation of the channel 5. It also has a discharge port 9 and a delivery port 10, the former opening into the channel 8 and the latter being in the bottom of the housing and adequately remote from the former.

The trap 7 has two ports 11 and 12 on the same side of the trap but spaced well apart, the port 11 being arranged for registration with the discharge port 9, and the port 12 for registration with the delivery port 10, but, on rotation of the trap, only one of its ports 11 and 12 can be brought into registration with its appropriate port 9 and 10 at a time.

The trap 7 is closed at one end by a plug 13 brazed in position and at the other end it is solid and provided with a stem 14 of reduced diameter, leaving a shoulder 15 flush with the adjacent end of the housing 6.

The trap 7 is inserted in the housing 6 before the adjacent end shield 2 of the motor is placed in position, and is secured by screws, one of which is shown at 16, the end shield abutting against the adjacent end of the housing 6 and the shoulder 15 of the trap, and having a hole 17 to allow the stem 14 to protrude. The outer end 18 of the stem is square to facilitate oscillation of the trap by a key or spanner. A screw-threaded pin 19 on the stem is adapted to strike against stop pins 20, 21 so that the degree of oscillation of the trap is limited to 180°, corresponding with the two positions of the trap 7 indicated in Figures 1 and 2.

Normally, the trap 7 is set in the position shown in Figure 1, to allow water of condensation to drain from the motor casing 1 along the channels 5 and 8, through the ports 9 and 11 into the trap 7, wherein it can accumulate but cannot escape.

Periodically, the trap 7 is rotated through 180° into the position shown in Figure 2, so that communication with the interior of the motor casing is cut off and the water in the trap 7 is discharged through the ports 12 and 10.

In the example above described, the trap 7 cannot be removed while the motor is in operative condition, it being necessary to remove the end shield 2 before the trap can be withdrawn from its housing.

The trap can be ground to fit the housing so that the clearance between its cylindrical surface and the housing does not exceed seven thousandths of an inch. The ports 9 and 10 can be so spaced apart that any possible leakage passage between them exceeds one inch.

In the example illustrated by Figures 4, 5 and 6, one end shield 2 of the motor casing 1 is provided with a drain hole 22 registering with a drain hole 23 in the motor casing 1.

The housing 6 of the draining device has lugs 43 drilled for screws 44 by which it is secured to the end shield 2, the lugs being recessed to receive the heads of the screws. The trap 7 is inserted in the bore of the housing from the outer end thereof and is locked against removal by a keep plate 24 abutting against the shoulder 15 and firmly secured by screws 26, the plate 24 having recesses for the reception of the heads of the screws.

The keep plate 24 has ledges 27 and 28 which act as stops to arrest an operating pin 29 and thereby to limit the rotation of the trap 7 to 180°.

The trap 7 has a single port 30 adapted to be brought alternately into registration with ports 31 and 32 in the housing 6. The port 31 communicates with the drain hole 22.

Normally the trap 7 is set in position so that water drained from the motor casing enters the trap 7 through the ports 31 and 30, the port 32 being closed.

Periodically, the trap 7 is rotated through 180° so that the port 31 is closed and the port 30 is brought into registration with the port 32 to allow the trapped water to be discharged.

In the example shown in Figures 7 to 12, the housing 6 is cast with a web 33 and a flange 34, the flange being secured by screws 24 to the end shield 2 of the motor, the flange 34 being recessed to receive the heads of the screws. A port 31 extends from the drain hole 22 in the end shield 2 to the bore of the housing. The cylindrical trap 7, as in the example last described, has a single port 30 for alternate registration with the port 31 and the discharge port 32 of the housing 6.

The housing is bored from one end to receive the cylindrical trap 7. The opposite end is drilled with a hole 32 to allow the stem 14 of the trap 7 to pass through, the stem being fitted with a handle 35 which also acts as an indicator.

The trap 7 is closed at one end by a plug 13 brazed in position.

When the trap has been inserted in the housing 6, it is locked in by a screw-threaded keep plate 36.

Figure 13:
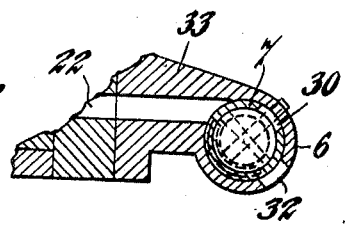
Figure 13 is a cross section of the housing and the trap, showing the latter in a "mid" position.

As in the examples previously described, the trap 7 may be ground to fit the housing so that the clearance does not exceed the limit of seven thousandths of an inch, or other limit fixed by regulations regarding creepage through clearances in bearings of flame-proof motors. The dimensions of the trap, housing and relative positions of the ports may be determined so that, in any position in which the trap may be set, the path of possible leakage or creepage through the clearance, from the port 31 to the port 32 shall exceed one inch, to comply with such regulations. For instance, assuming that the trap 7 has a diameter of 1¼", when the trap 7 is in the "shut" or "drain" positions, Figures 10 and 11, the length of the shortest leakage or creepage path from the port 31 to the port 32 would be 1½". With the trap in the "mid" position, Figure 13, the shortest path of leakage or creepage through the clearance is composed of two parts, one from the port 31 to the port 30 and the other from the port 30 to the port 32, each being ½".

The shortest length of the leakage or creepage path from the port 31 to the hole 37 may be 1.3".

Figure 12:
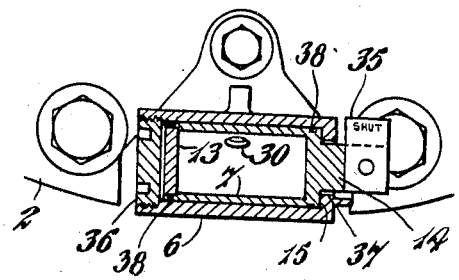
Figure 12 is a sectional elevation on the line XII—XII Figure 10.

The trap, as shown in Figure 12, has packing grooves 38 filled with a mixture of graphite and grease so that clearance leakage endwise of the trap is further guarded against.

In the normal position, the handle 35 has been turned to set the trap 6 with the port 30 in registration with the port 31, the delivery port 32 being closed. Water of condensation drains from the motor through the drain holes 23, 22 and ports 31 and 30 and accumulates in the trap 6.

Periodically, the handle 35 is turned through 180° to set the trap with its port 30 in registration with the port 32, the port 31 being closed. The trapped water is then delivered through the port 32.

In the examples illustrated by Figures 4 to 12, the removal of the trap from the housing, or the housing from the end shield can be effected by the use of special spanners but it is sufficiently difficult to avoid careless removal. The removal of the housing from the end shield, in the example shown in Figures 7 to 12, when the motor is fixed on a bed is difficult owing to the lower screws 24 being practically inaccessible.

I claim:

1. A flame-proof electric motor having a drain in the lower part thereof for the discharge of water of condensation accumulating in the motor casing, and a movable trap fitted in a housing adjacent to the motor drain, the trap being adapted, as it is moved in its housing from one position to another, alternately to receive water from the motor drain through a port in the housing and to deliver it through a delivery port in the housing, the trap and its housing being such that the port in the housing for receiving water from the motor is always closed when the delivery port of the housing is open, and vice versa, and an uninterrupted connection between the interior and exterior of the motor through the trap is impossible in whatever position the trap may be left.

2. A flame-proof electric motor provided with means for periodically delivering water of condensation from the motor casing according to claim 1, wherein the housing for the trap is a fixture and the trap is so mounted in it that the housing cannot be removed from the motor casing nor the trap from the housing while the motor is in operative condition.

3. A flame-proof electric motor provided with means for periodically delivering water of condensation from the motor according to claim 1, wherein the trap is of cylindrical form and has a stem of reduced diameter at one end, and the housing has a cylindrical bore to receive the trap, one end of the bore being permanently closed and the opposite end being closed by a keep plate having a hole to permit of the stem of the trap protruding therefrom so as to permit of rotation of the trap but to prevent its withdrawal from that end.

4. A flame-proof electric motor provided with means for periodically delivering water of condensation from the motor according to claim 1, wherein the trap is of cylindrical form and has a stem of reduced diameter at one end protruding through a hole in the adjacent end of the housing so as to permit of rotation of the trap but to prevent its withdrawal from that end, the opposite end of the trap being permanently closed and the end of the housing adjacent thereto being closed by a keep plate.

PAUL ALPHONSE HUBERT MOSSAY.